UNITED STATES PATENT OFFICE.

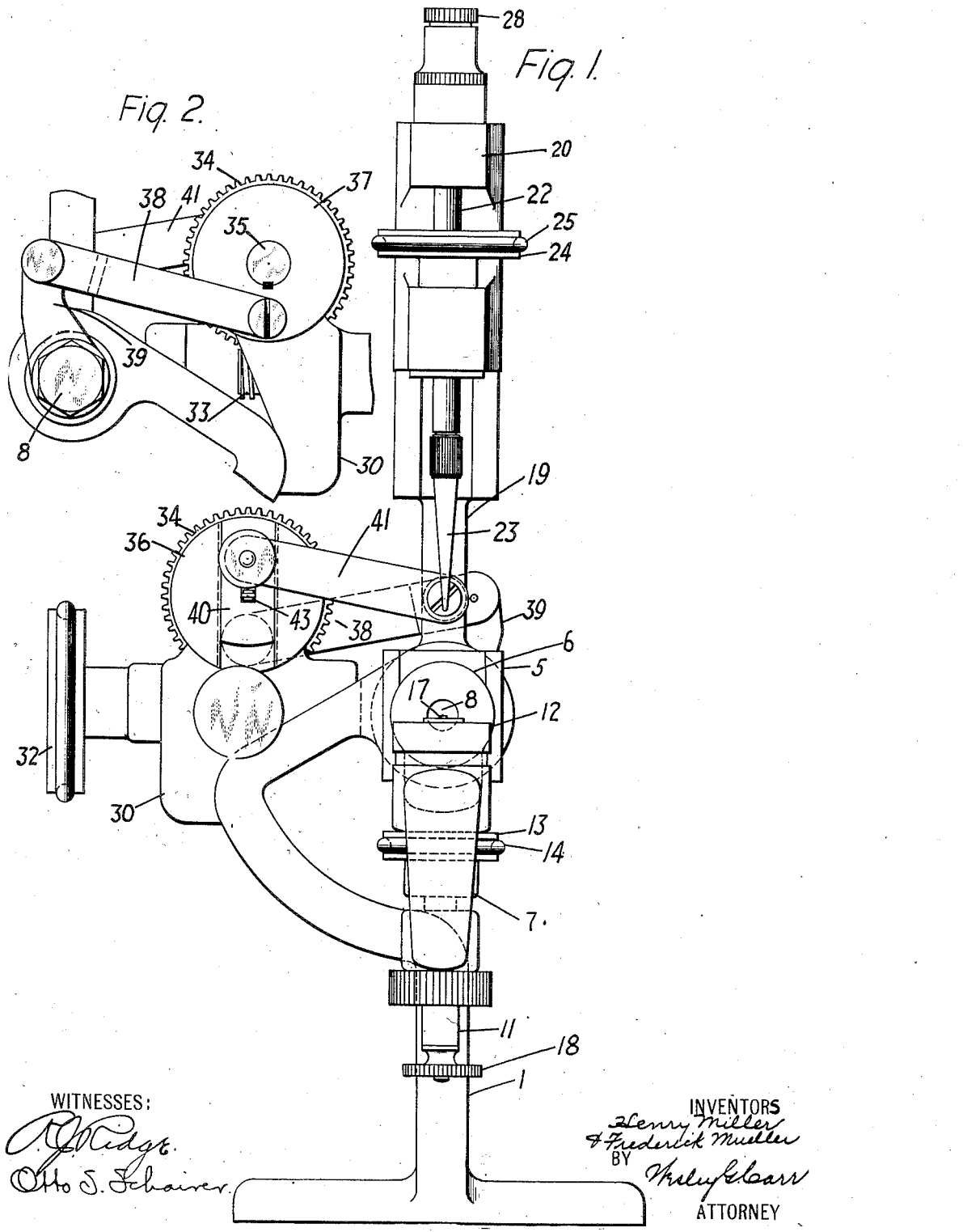

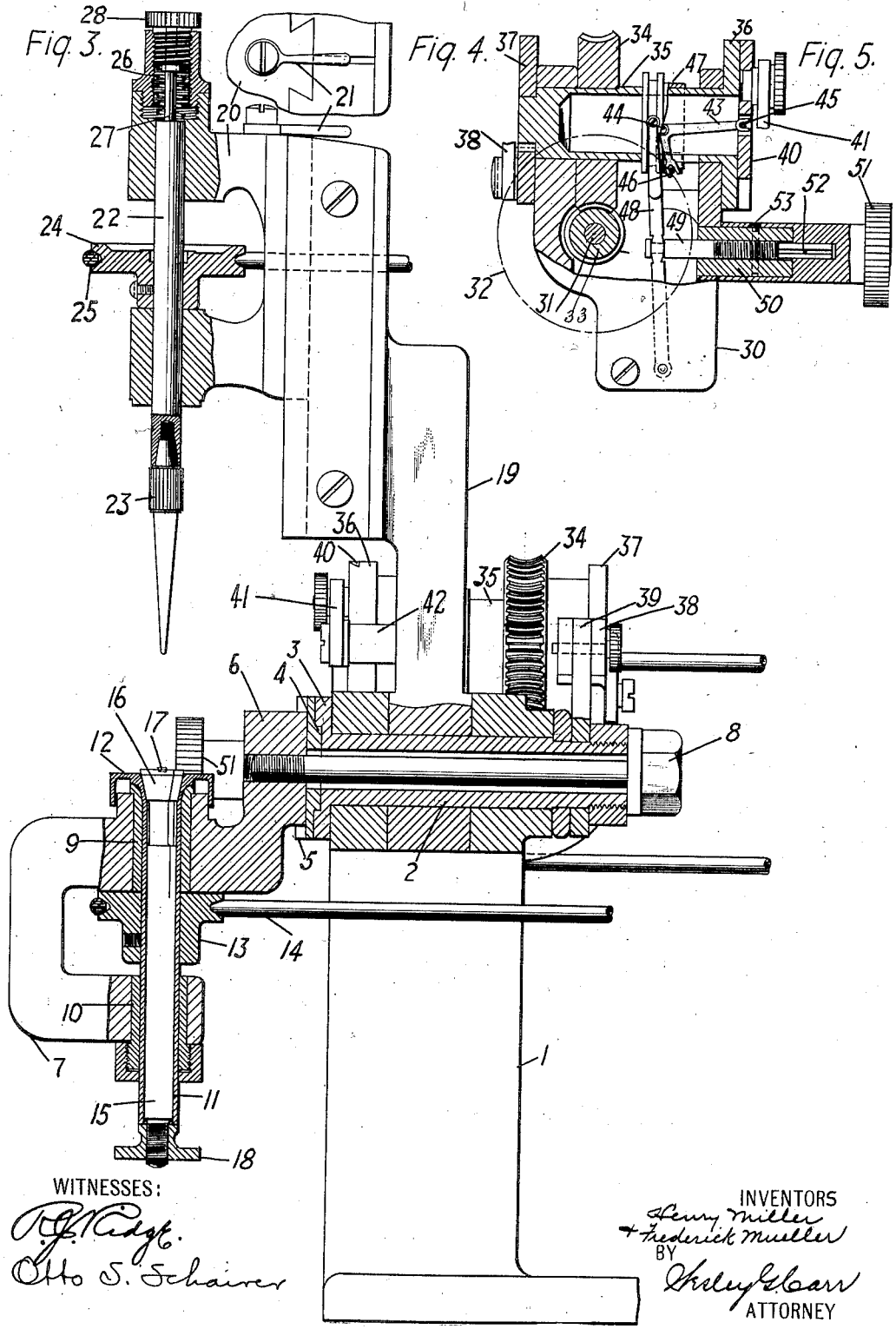

HENRY MILLER, OF NEWARK, AND FRIEDRICH MUELLER, OF IRVINGTON, NEW JERSEY, ASSIGNORS TO WESTINGHOUSE ELECTRIC AND MANUFACTURING COMPANY, A CORPORATION OF PENNSYLVANIA.

MACHINE FOR MANUFACTURING BEARING-JEWELS.

1,097,726.  Specification of Letters Patent.  Patented May 26, 1914.

Application filed October 17, 1912. Serial No. 726,267.

*To all whom it may concern:*

Be it known that we, HENRY MILLER and FRIEDRICH MUELLER, citizens of the United States, and residents, respectively, of Newark and Irvington, both in the county of Essex and State of New Jersey, have invented a new and useful Improvement in Machines for Manufacturing Bearing-Jewels, of which the following is a specification.

Our invention relates to machines for manufacturing bearing jewels for watches, electric meters and similar devices, and it has for its object to provide a machine whereby bearing jewels may be manufactured more expeditiously and cheaply and more uniformly and reliably perfect than is possible when the jewels are manufactured by hand.

Our invention is illustrated in the accompanying drawings, Figure 1 of which is a view, in front elevation, of a machine embodying the same. Fig. 2 is a view, in rear elevation, of some of the parts of the machine. Fig. 3 is a view, in side elevation and in section. Fig. 4 is a plan view showing only a few of the parts of the machine, and Fig. 5 is a view, in side elevation and in section, of some of the parts of the machine.

The operating parts of the machine are carried by a base or standard 1 having a bifurcated upper end in which a sleeve 2 is rotatably mounted, the front end of the sleeve being provided with a flange 3 having a transverse recess for the reception of a boss 4 upon the rear face of a block 5. The block 5 is, in turn, provided, in its front face, with a vertical recess for the reception of an extension 6 from one leg of a substantially U-shaped bracket 7 constituting a work holder support, the said parts being clamped together by a bolt 8 that passes through the sleeve 2 and is threaded into the work holder support. A suitable amount of clearance is left between the sides of the bolt 8 and the sleeve 2 to permit of adjustments between the parts 3, 4 and 6 in order that the work holder support may be adjusted to its proper position.

The work holder support is provided with bearings 9 and 10 for a vertical tubular shaft 11 that has a head 12 at its upper end and carries a pulley 13 for a driving belt 14. The tubular shaft 11 contains a rod 15 having a frusto-conical head 16 at its upper end that is seated in a correspondingly shaped portion of the head 12 of the said shaft. The upper end face of the shaft is also provided with a recess for the reception of the jewel 17 to be formed into a bearing, the upper end of the shaft being split so that the frusto-conical head thereon may serve as a chuck or work holder. The lower end of the rod 15 is threaded and is provided with a nut 18 for drawing the rod downwardly to cause the jaws of the chuck to clamp the jewel.

The sleeve 2 serves as a pivot for a tool post 19 that is mounted in the bifurcated upper end of the base 1 and is provided in its front face with a longitudinal dovetail shaped guide recess for a vertically reciprocable tool head 20. When the machine is not in use, the tool head is locked in its uppermost position by means of a small handle 21 that is pivoted to the upper end of the tool head and may be rotated to bear upon the upper end of the tool post. The tool head 20 provides bearings for a shaft 22 having a threaded recess at its lower end for the reception of a tool 23, a set of tools being provided that are adapted to work the jewel, in succession, from its rough to its final finished condition. The shaft 22 is provided with a pulley 24 that is driven by a belt 25, the direction of rotation of the shaft 22 being preferably opposite to the direction of rotation of the shaft 11. The shaft 22 is capable of movement longitudinally in the tool head, but is normally maintained in the position shown by means of a helical compression spring 26 that is contained in a recess in the upper end of the tool head and surrounds a guide pin or extension 27, the pressure of the spring being adjustable by means of a nut 28. A lateral boss 30 is provided with bearings for a shaft 31 that is driven by a pulley 32 and is provided at one end with a worm gear 33 that meshes with a gear 34. The gear 34 is mounted upon a short hollow shaft 35 having a flange 36 at one end and carrying a disk 37 at its other end, a connecting rod 38 being eccentrically pivoted at one end to the plate 37 and connected at its other end to an arm 39 that is fixed to sleeve 3. The rotation of the shaft 35 therefore serves, through the parts 37, 38 and 39, to impart a rotary reciprocating motion to the sleeve 2 and the tool holder support.

The front face of the flange 36 upon the shaft 35 is provided with a dove-tail shaped guide recess for a block 40 of somewhat less length than the diameter of the said flange, the said block being pivotally connected to one end of a connecting rod 41, the other end of which is pivotally connected to a boss 42 upon the tool post 19. The block 40 is adapted to be moved in the guide recess by means of a bell crank lever 43 that is mounted upon a pin 44 extending transversely of and carried by the hollow shaft 35, the ends of the said bell crank lever being forked for engagement with pins 45 and 46, respectively, the former of which is carried by the block 40. The pin 46 is carried by a sleeve 47 that is mounted upon the shaft 35 and is capable of movement longitudinally thereof, the said sleeve being provided with a circumferential recess for the reception of pins carried at the extremities of the prongs of a forked lever 48 that is pivoted at its lower end to the base of the machine. The lever 48 is actuated, for the purpose of moving the sleeve 47 longitudinally of the shaft 35, by means of a screwthreaded rod 49 that is connected to the lever in a manner to permit of its rotation. The rod 49 is screwed into a stationary nut 50 and is adapted to be rotated, for the purpose of actuating the lever 48, by means of a knurled head 51 that carries a pin 52 passing through a slot in the outer end of the rod, the nut 50 being provided with a circumferential recess for the reception of a screw 53 that is screwed into and secured to a cylindrical shell portion of the head 51 within which the nut 50 is partially located. When the knurled head 51 is rotated, the lever 48 causes the sleeve 47 to move longitudinally of the shaft 35, thereby actuating the bell crank lever 43 so as to move the block 40 in the guide recess in the flange 36. In this manner, the eccentricity of the connection of the rod 41 to the flange 36 may be varied, and thereby also the amount of reciprocating movement of the tool post.

In the operation of the machine, a jewel 17 to be shaped into a bearing is first mounted in the chuck at the upper end of the rod 15, the parts being preferably so adjusted that the center of the jewel is on a line with the axis of reciprocating movement of the work holder and tool head. After a tool has been inserted in the lower end of the shaft 22 for roughly shaping the jewel, the machine is set in motion. The lever 21 is turned to permit of lowering the tool upon the jewel, and the proper degree of reciprocating movement of the tool head is provided for by adjustment of the head 51. After the jewel is roughly shaped, other tools may be employed for gradually shaping it closer and closer to its finished form, and suitable polishing tools may finally be employed. By reason of the reciprocation of both the tool post and the work holder, and of the rotation of both the jewel and the tool holders, the jewel and the tool are brought into engagement at varying angles during their rotation, with the result that the jewels may be perfectly finished, and, since all of them may be treated alike, a greater reliability and uniformity of the product may be secured than with the jewels that are finished by hand.

We claim as our invention:

1. A jewel finishing machine comprising a rotatable jewel holder, and a rotatable tool holder, the said jewel and tool holders being revolubly reciprocable about an axis passing substantially through the jewel.

2. A jewel finishing machine comprising a rotatable jewel holder, and a rotatable tool holder, the said jewel and tool holders being revolubly reciprocable.

3. A jewel finishing machine comprising a rotatable jewel holder, and a rotatable tool holder that is resiliently mounted and movable toward, and away from, the jewel holder, the said jewel and tool holders being revolubly reciprocable about an axis passing substantially through the jewel.

4. A jewel finishing machine comprising a rotatable jewel holder, and a rotatable tool holder that is movable toward, and away from, the jewel holder, the said jewel and tool holders being revolubly reciprocable about an axis passing substantially through the jewel.

5. A jewel finishing machine comprising a rotatable jewel holder, and a rotatable tool holder that is movable toward, and away from, the jewel holder, the said jewel and tool holders being revolubly reciprocable.

6. A jewel finishing machine comprising a rotatable jewel holder, a rotatable tool holder, the said holders being revolubly reciprocable about an axis passing substantially through the jewel, and means for varying the amplitude of reciprocation of the tool holder.

7. A jewel finishing machine comprising a rotatable jewel holder, a rotatable tool holder, the said holders being revolubly reciprocable and means for varying the amplitude of reciprocation of the tool holder.

8. A jewel finishing machine comprising a rotatable jewel holder, and a rotatable tool holder, the said holders being simultaneously revolubly reciprocable in the same direction about an axis passing substantially through the jewel.

9. A jewel finishing machine comprising a rotatable jewel holder, a revolubly reciprocable supporting frame therefor, a rotatable tool holder, a revolubly reciprocable head therefor, driving eccentrics for said frame and said head, and means for varying the throw of the eccentric that actuates the tool head.

In testimony whereof, we have hereunto subscribed our names this 27th day of Sept., 1912.

HENRY MILLER.
FRIEDRICH MUELLER.

Witnesses:
 EDWARD LEONARD,
 C. C. CROFFT.